(Model.)
2 Sheets—Sheet 1.
G. D. BELCHER.
Hand Drill.
No. 240,223. Patented April 19, 1881.
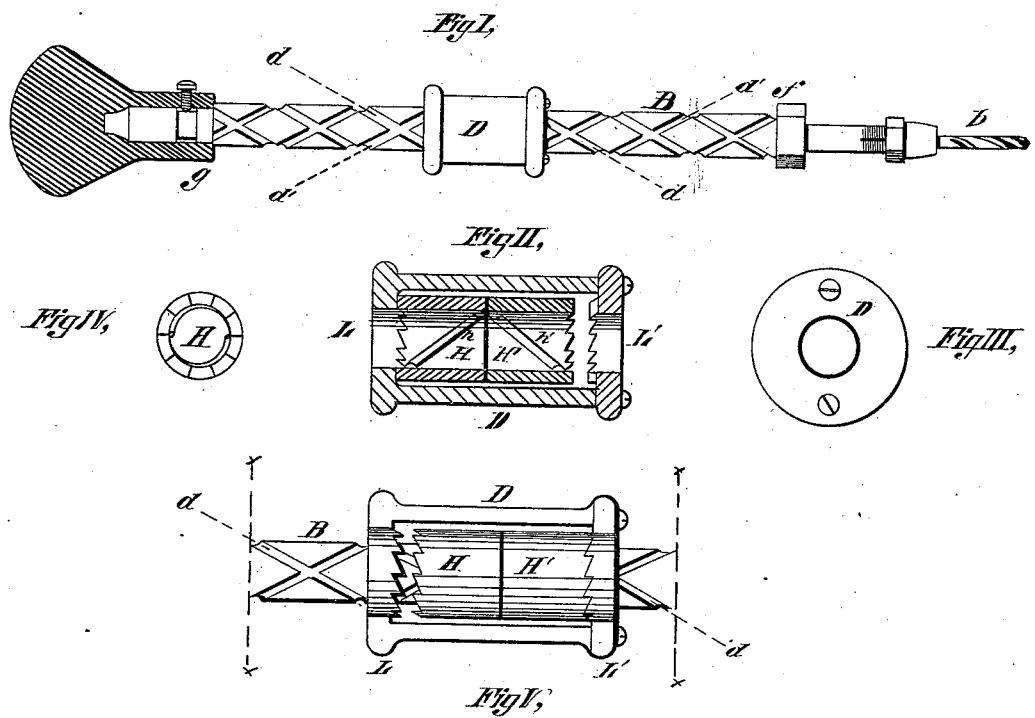
Witnesses
W. H. Burrall
W. B. Parker
Inventor
G. D. Belcher
by R. P. Hyde atty.

(Model.)
2 Sheets—Sheet 2.
G. D. BELCHER.
Hand Drill.
No. 240,223.
Patented April 19, 1881.
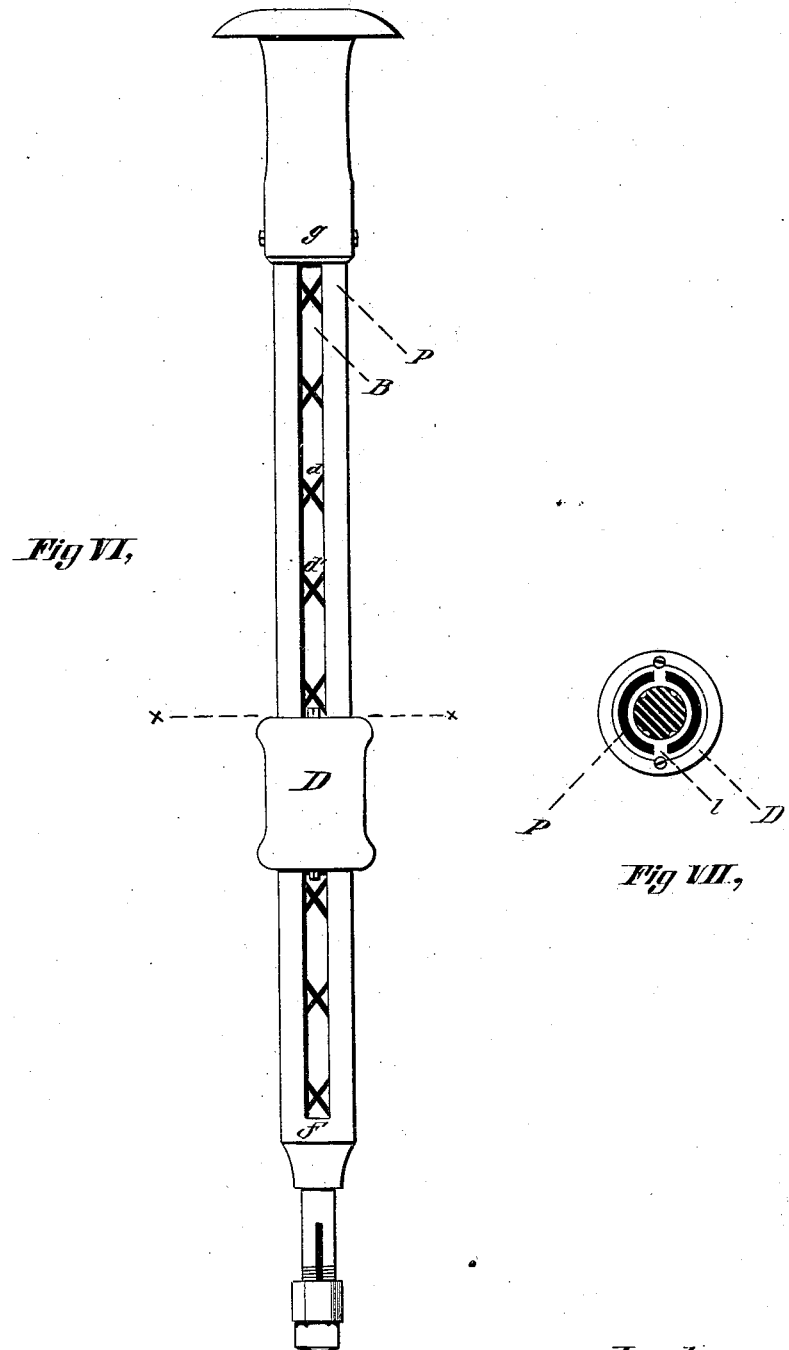

UNITED STATES PATENT OFFICE.

GEORGE D. BELCHER, OF SPRINGFIELD, MASSACHUSETTS, ASSIGNOR OF ONE-HALF TO WILLIAM C. McCLALLAN, OF SAME PLACE.

HAND-DRILL.

SPECIFICATION forming part of Letters Patent No. 240,223, dated April 19, 1881.

Application filed December 13, 1880. (Model.)

*To all whom it may concern:*

Be it known that I, GEORGE D. BELCHER, of Springfield, State of Massachusetts, have invented an Improvement in Hand-Drills, of which the following is a specification.

My invention consists of improvements upon the hand-drill for which patent was granted George D. Washburn, July 26, 1859, No. 24,894, in which a stem having one end revolving in a handle and its other end provided with a drill has intersecting right and left grooves and a nut-sleeve, which, when reciprocated on said stem, imparts a rotary motion in one and the same direction to the drill; and my improvements have for their object the perfection of the mechanism for producing the results aimed at by reducing to the minimum the friction between the operating-nut and screw-stem.

In the drawings, Figure I is a general view of the drill with the guiding-sleeve removed. Figs. II, III, IV, and V are enlarged details. Fig. VI is a view of the complete drill; and Fig. VII is a partial cross-section on the line $x\,x$, Fig. VI.

The stem B, having the drill $b$ secured in the usual way on its prolonged axis, is provided with the right and left grooves $d\,d'$, in sets of two; the grooves of each being parallel, and being of the same pitch, and the one set intersecting the other set, form upon the stem B what is, in effect, a right-and-left quick-screw, as shown in Fig. I. Upon this screw-stem B, and between the stops formed by the collar $f$ at one end and the handle $g$, into which it is stepped, at the other end of the stem, is sleeved the operating-slide D, which, by its reciprocation, gives motion to the drill.

The slide or handle D consists of the right and left nuts H H', whose lands or grooves $h\,h'$ engage, respectively, with the threads $d\,d'$ of the stem B of the ends L L', sleeved upon the outer surface of the stem B, and rigidly connected or framed to each other, as shown in Figs. II and V, and of the connections $l\,l$, that serve to so frame the ends L L' to the outer case of the handle D by passing through the slots in the wall of the case P of the drill-stem B, as shown in Fig. VII. The outer edges of the nuts H H' are provided with ratchet-teeth to clutch with corresponding teeth upon the inner faces of the sleeve ends L L', and these nuts H H', thus inclosed between the ends L L', have sufficient space left between them to enable one to be disengaged while the other is clutched fast to the slide D, so that when the slide D is moved one nut becomes part of the slide to impart motion to the drill, while the other is free to follow within the slide upon the stem until the direction of the slide D is changed, when it, in its turn, becomes operative with the slide, both directions taken by the slide being converted into a rotation in one and the same direction to the drill, the only lost time in the positive action of the slide-handle D being the short interval taken in moving the slide a distance corresponding to the space between the two nuts within it upon reversing its direction.

The general operation of the device, as above described, is common to the patent before alluded to; but in operation it is found that where one thread, as in a common screw, is used to impart through a segment of a nut a rotation, the slide will bind upon the opposite side of the stem from the engaging segment, and that in practice it is impossible, where one thread is employed, to prevent a distortion of the slide from its normal position to produce an excessive friction—to entirely obviate which I arrange upon the stem two parallel threads, as shown in the drawings, so that the segments $h\,h'$ will engage with threads simultaneously upon opposite sides of the stem B to completely balance the slide D upon its stem. And to further remove a source of friction—*i. e.*, that produced by the ends of the segments $h\,h'$ coming against the bottoms of the grooves $d\,d'$—the handle D is suspended upon the sleeve-case P, secured, as shown in Fig. VI, to the handle $g$ at one of its ends and over the drill-stem at its other.

The sleeve P is slotted upon each side, to permit the connections $l\,l$ to unite the ratchet ends L L with the outer shell of slide D, and the edges of this slot form straight edges, to assist in guiding and holding the segments $h\,h'$ in their proper relative position.

By these means I form a hand-drill in which the friction is reduced to the minimum to render it possible for a nut working upon a quick-screw to be available for many operations requiring considerable power.

What I claim is—

1. In combination with a stem, B, having sets of two or more right and left intersecting grooves or lands, the reciprocating slide-handle provided with right and left nuts, to engage with the stem upon opposite sides thereof to rotate it, by becoming alternately fixed to the slide with its change of direction, as shown and described.

2. The combination, with the stem B, having right and left intersecting grooves or lands $d\ d'$, and with the slotted sleeve P, the operating slide-handle D, bearing upon the sleeve P and against the straight edge of its slots, and engaging with the screw-stem B, as shown and described.

GEORGE D. BELCHER.

Witnesses:
R. F. HYDE,
F. E. CARPENTER.